US009732793B2

(12) United States Patent
Loof et al.

(10) Patent No.: US 9,732,793 B2
(45) Date of Patent: Aug. 15, 2017

(54) BEARING AND BEARING ARRANGEMENT

(71) Applicants: Marcus Loof, Nol (SE); Peter James, Mölndal (SE); Lars Stigsjöö, Angered (SE)

(72) Inventors: Marcus Loof, Nol (SE); Peter James, Mölndal (SE); Lars Stigsjöö, Angered (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/089,946

(22) Filed: Apr. 4, 2016

(65) Prior Publication Data

US 2016/0298685 A1   Oct. 13, 2016

(30) Foreign Application Priority Data

Apr. 9, 2015   (SE) ..................... 1550422

(51) Int. Cl.
*F16C 19/38*   (2006.01)
*F16C 33/66*   (2006.01)
(Continued)

(52) U.S. Cl.
CPC ............ *F16C 23/086* (2013.01); *F16C 33/48* (2013.01); *F16C 33/495* (2013.01);
(Continued)

(58) Field of Classification Search
CPC ........ F16C 19/28; F16C 19/305; F16C 23/08; F16C 33/467; F16C 23/086; F16C 33/583;
(Continued)

(56) References Cited

U.S. PATENT DOCUMENTS 2,430,397 A * 11/1947 Hendricks ............. F16C 23/086
384/577
4,671,682 A * 6/1987 Yoshihara ............... F16C 19/26
384/480
(Continued)

FOREIGN PATENT DOCUMENTS

JP   2007024112 A * 2/2007
JP   2009068592 A   4/2009
(Continued)

*Primary Examiner* — Marcus Charles
(74) *Attorney, Agent, or Firm* — Bryan Peckjian; SKF USA Inc. Patent Dept.

(57) ABSTRACT

A spherical roller bearing having an outer ring providing at least one inner raceway, an inner ring providing a first and a second outer raceway, a plurality of roller elements arranged in a first and second roller row in-between the at least one inner raceway and the respective first and second outer raceway is provided. The bearing provides a cage for guiding the roller elements in the first and second roller row, the cage includes a plurality of cage pockets, wherein in each cage pocket one of the roller elements is disposed. The bearing further presents a specific pitch circle diameter (PCD), and the cage is essentially in-pitch roller centered in relation to the pitch circle diameter (PCD) when there is an axial force acting on the bearing. In addition, the present invention regards a bearing arrangement and a wind turbine bearing arrangement.

9 Claims, 3 Drawing Sheets

(51) Int. Cl.
*F16C 33/30* (2006.01)
*H02K 7/08* (2006.01)
*F16C 23/08* (2006.01)
*F16C 33/58* (2006.01)
*F16C 33/50* (2006.01)
*F16C 33/48* (2006.01)
*F16C 33/49* (2006.01)

(52) U.S. Cl.
CPC .......... *F16C 33/504* (2013.01); *F16C 33/583* (2013.01); *F16C 19/38* (2013.01); *F16C 2300/14* (2013.01); *F16C 2360/31* (2013.01); *H02K 7/08* (2013.01)

(58) Field of Classification Search
CPC ........ F16C 33/49; F16C 33/504; F16C 33/48; H02K 7/08
USPC ....... 384/515, 558, 561, 570, 572, 586, 495, 384/559, 564–565; 290/44
See application file for complete search history.

(56) References Cited

U.S. PATENT DOCUMENTS

| | | | | |
|---|---|---|---|---|
| 4,916,750 A | * | 4/1990 | Scott | F16C 23/086 384/484 |
| 5,145,267 A | * | 9/1992 | Takata | F16C 23/086 384/558 |
| 5,503,030 A | * | 4/1996 | Bankestrom | F16C 19/522 73/862.49 |
| 6,116,785 A | * | 9/2000 | Kondo | B21B 31/076 384/463 |
| 6,814,494 B2 | * | 11/2004 | Borowski | F16C 23/086 384/484 |
| 8,007,184 B2 | * | 8/2011 | Murai | F16C 19/38 384/450 |
| 2007/0127858 A1 | * | 6/2007 | Nakagawa | F16C 19/505 384/495 |
| 2007/0292065 A1 | * | 12/2007 | Falk | F16C 23/086 384/477 |
| 2007/0297706 A1 | * | 12/2007 | Mori | F16C 23/086 384/558 |
| 2009/0190874 A1 | * | 7/2009 | Burner | F16C 19/386 384/480 |
| 2014/0050431 A1 | * | 2/2014 | Brameshuber | D21F 7/02 384/495 |
| 2015/0252847 A1 | * | 9/2015 | Linden | F16C 23/086 384/551 |

FOREIGN PATENT DOCUMENTS

JP  2010190241 A  *  9/2010
JP  2012017770 A  *  1/2012

* cited by examiner

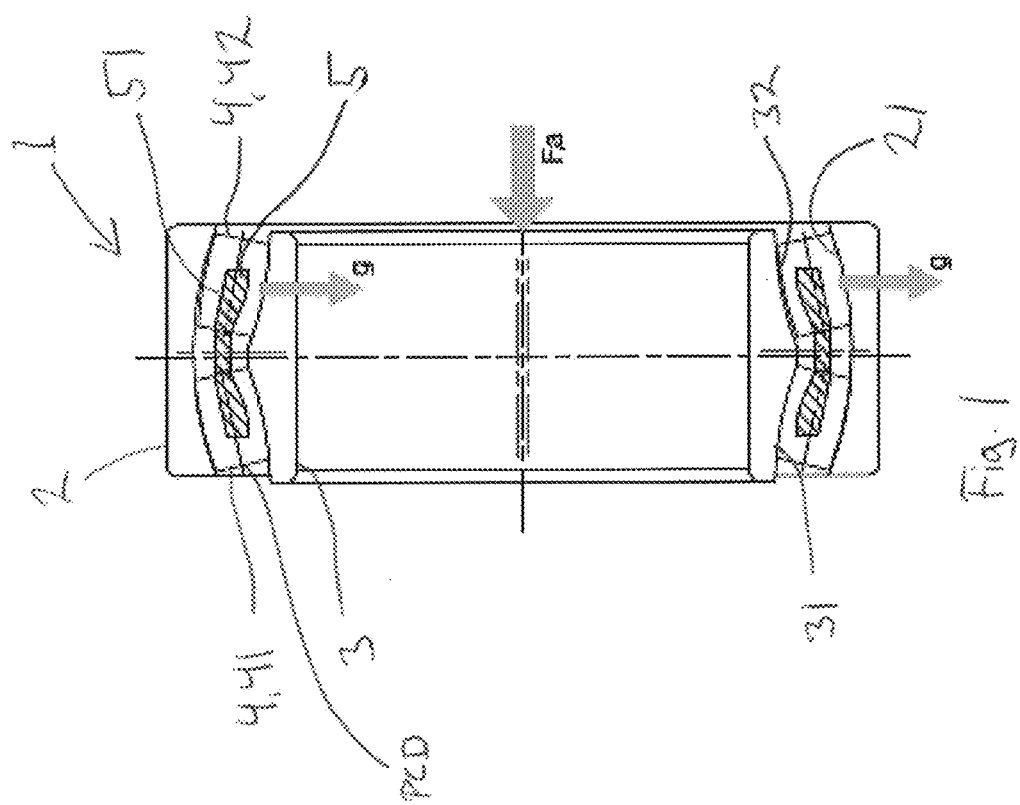

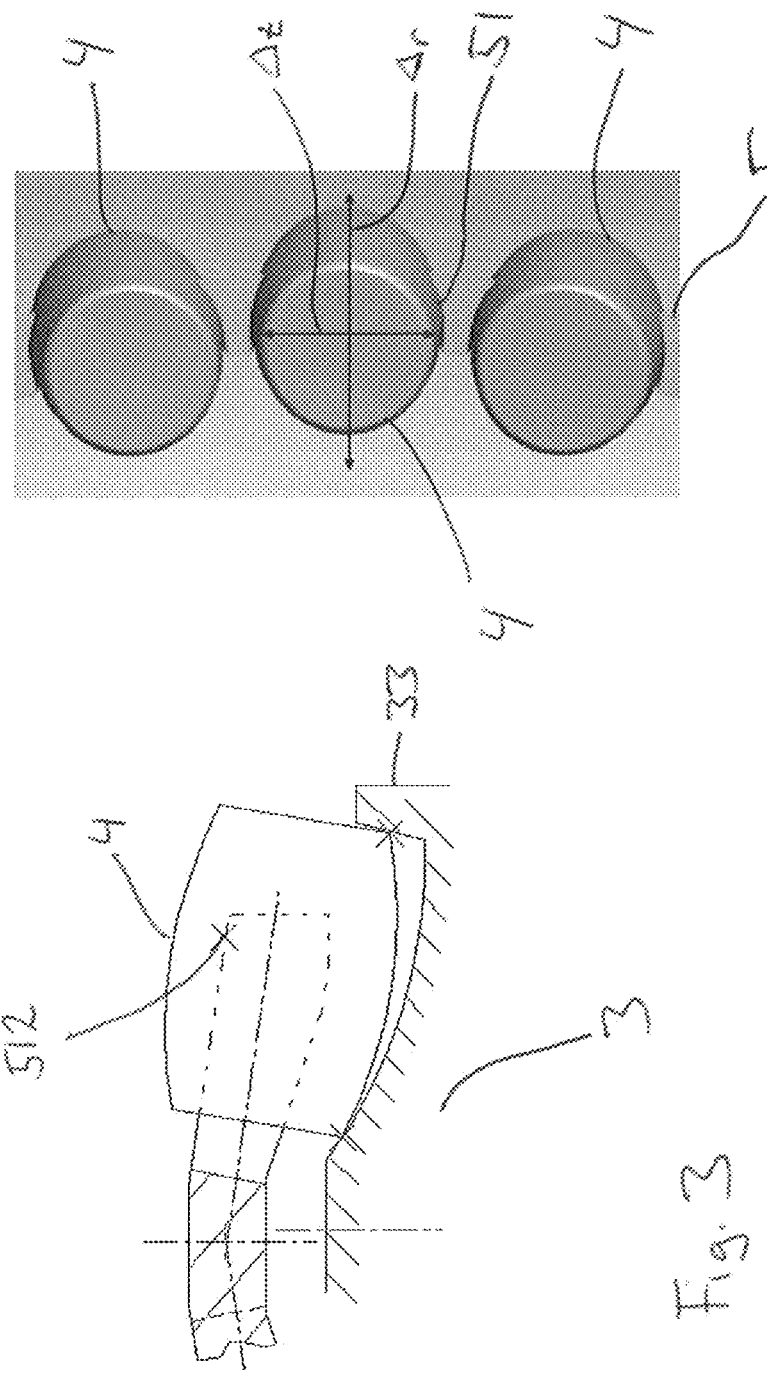

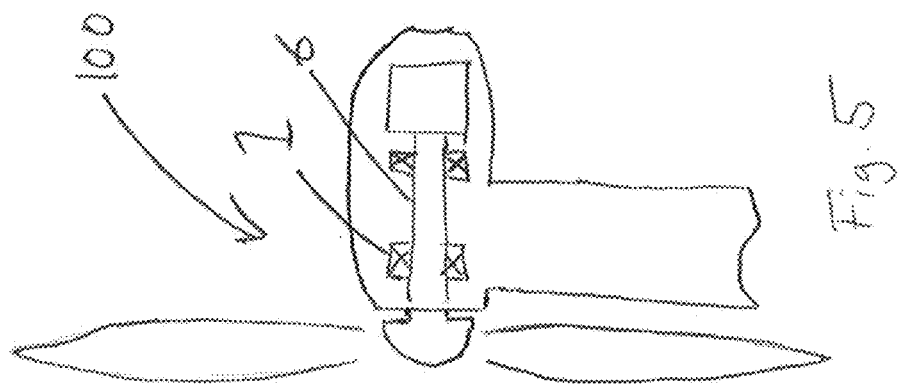
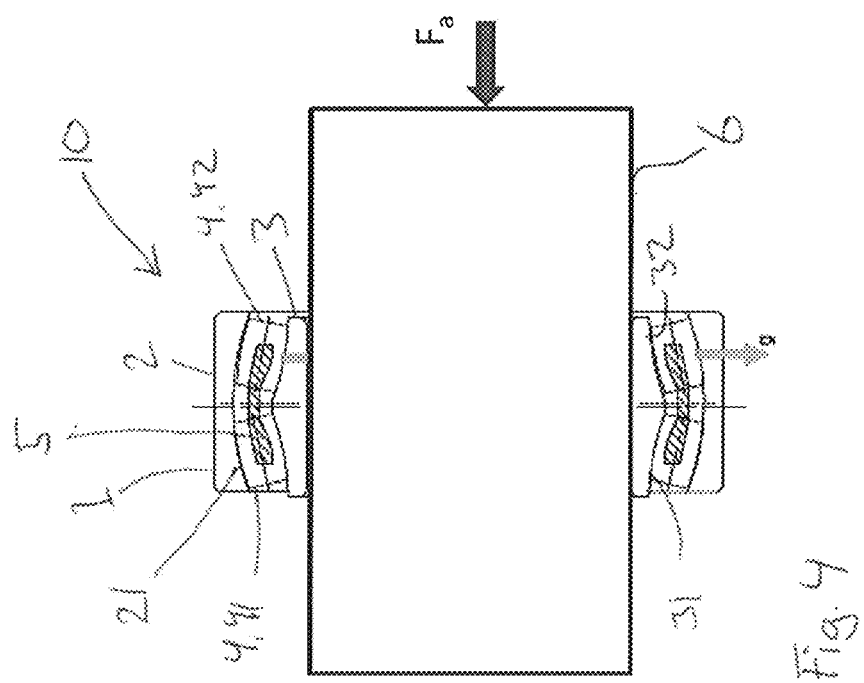

BEARING AND BEARING ARRANGEMENT

CROSS-REFERENCE TO RELATED APPLICATIONS

This application claims priority to Swedish patent application no. 1550422-8 filed on Apr. 9, 2015, the contents of which are fully incorporated herein by reference.

TECHNICAL FIELD

According to a first aspect, the invention regards a spherical roller bearing. According to a second aspect, the invention regards a bearing arrangement. According to a third aspect, the invention regards a wind turbine bearing arrangement.

BACKGROUND

Spherical roller bearings are well known for its ability to accommodate radial and axial loads, but also for its misalignment ability. These bearings are used in many different applications, especially in more demanding applications where there are larger loads and also where there may be shaft deflections. One example of where a spherical roller bearing can be advantageously used is in wind turbine applications. Other examples of areas where these bearings can be a suitable alternative is in pulp and paper machines, marine applications, off-highway applications and in mining applications.

There are several different designs available. For instance, there are spherical roller bearings comprising comb-shaped cages, but also bearings comprising window type cages. In addition, some of the known designs include guide rings and other bearing types include mid-flanges on the inner rings. The different designs present different advantages and are thus useful and adapted to different needs. The bearings may for instance be optimized for different circumstances and environments, such as for high or low speed applications, mainly for radial loads, mainly for axial loads, for large shaft deflections etc.

SUMMARY OF THE INVENTION

In view of the above, an object of the present invention is to provide a new spherical roller bearing design and bearing arrangement which alleviates at least some of the drawbacks of the prior art. Moreover, an object of the present invention is to provide a spherical roller bearing design which is more adaptable and useful for applications where there are axial loads acting on the bearing.

The objects have been achieved by the features as presented in the independent claims. Advantageous embodiments of the invention can be found in the dependent claims and in the accompanying description and drawings.

According to the first aspect thereof, the objects have been achieved by a spherical roller bearing, comprising, an outer ring presenting at least one inner raceway, an inner ring presenting a first and a second outer raceway, and a plurality of roller elements arranged in a first and second roller row in-between the at least one inner raceway and the respective first and second outer raceway. In addition, the bearing comprises a cage for guiding and/or retaining the roller elements in the first and second roller row, and wherein the cage presents a plurality of cage pockets, in which each cage pocket one of the roller elements is meant to be located. The bearing further presents a specific pitch circle diameter (PCD), and the cage is essentially in-pitch roller centered in relation to the pitch circle diameter (PCD) when there is an axial force acting on the bearing.

A bearing's pitch circle diameter is something which is well known by the skilled person. The pitch circle diameter can be defined as the diameter that intersects the rotational axle of the roller elements in the bearing in an axial location of the bearing. In addition, the phrases axial and radial are frequently used in this document. If nothing else is stated, an axial direction is defined as the axial direction of the bearing which is parallel to its rotational axis, the axial direction of the inner ring which is parallel to its rotational axis, the axial direction of the outer ring which is parallel to its rotational axis and the axial direction of the cage which is parallel to its rotational axis. Radial direction is the direction which is perpendicular to the corresponding axial directions.

With this design, where the cage will center on the roller elements and essentially in the pitch circle diameter of the bearing, a more robust bearing will be realized for applications where there is an axial load acting on the bearing. In a further embodiment, the essentially in-pitch roller centering is arranged such that one of the first or second roller rows is in contact with the cage. More specifically, it will be the roller row which is loaded by the axial load acting on the bearing. This will lead to that the cage will behave in a more stable manner in the bearing since it centers on the loaded roller row. The rollers of this roller row will be fixed in its specific roller path in the bearing and may not fluctuate or skew due to that these rollers are loaded. The other roller row, which is thus unloaded, will be transported and guided by the cage which moves in a stable manner.

In an embodiment of the present invention, the cage pockets in relation to the roller elements contained therein present a specific gap in the tangential direction of the cage, and wherein the tangential gap is set such that the cage pockets of one of the roller rows will contact the roller elements of the one roller row when an axial force is applied to the bearing. Thus, by setting the tangential gap such that there will be a contact between the roller elements in one of the roller rows when there is an axial force acting on the bearing, the cage will be centered by the rollers. In addition, the shape of the cage pocket and the tangential gap may be set such that the cage is essentially in-pitch centered, i.e. the contact cage/rollers will be in the vicinity of the bearing's pitch circle diameter (PCD), which will lead to a more stable roller centering.

In an embodiment of the present invention, the bearing does not present any spacer ring or mid-flange axially in-between the first and second roller rows. It is well known to make use of a spacer ring, such as a guide ring axially in-between the two roller rows of the bearing. The guide ring is especially useful when the bearing is used in more high-speed applications. In addition, the cage is often centered on the guide ring, which in turn is in contact with the inner ring. By removing the guide ring from the bearing, there will be fewer components. This is of course advantageous in terms of cost, but also it may lead to a more robust bearing design due to the fact that there will be fewer components in the bearing. Moreover, a mid-flange, which is frequently used in prior art designs, is also costly to have since the manufacturing of an inner ring comprising a mid-flange will be more complicated. Also, the presence of a mid-flange will result in more material, leading to a higher weight and also a higher material cost. In addition, the design of the present invention will lead to that there will be a free space between the cage and the inner ring in-between the first and second roller row. This space can be used for lubricant, such as grease or oil. This may lead to that the lubrication of the contact between the raceways of the inner ring and the roller elements is improved since the lubricant can be stored in the proximity of these contact zones.

In another embodiment, a spacer ring or guide ring for guiding the roller elements is present axially in-between the first and the second roller row. A spacer ring may be needed in applications where there are higher rotating speeds. For instance, the spacer ring may guide the roller elements in the first and second roller row.

In an embodiment of the present invention, a spherical roller bearing is presented, wherein at least one of the plurality of cage pockets is radially outwardly enclosing the roller contained therein such that the roller element will be restricted to move radially outwardly out from the at least one cage pocket. By having such a design the roller elements can be prevented from falling out from the bearing, for instance during assembly of the bearing. In another embodiment, the inner ring further presents a first and second axially outer region on opposite axial sides of the bearing, wherein the respective first and second axially outer region presents a first and second respective side flange. The side flange can further improve and prevent rollers from falling out from the bearing.

In an embodiment of the present invention, the cage is a comb-shaped cage (also known as a pronge type cage). In an embodiment, the cage is made of a polymer, a metal such as brass, steel or iron, or any other suitable material recognized by the skilled person.

According to the second aspect of the invention, a bearing arrangement is presented, wherein the bearing arrangement comprises a bearing according to the first aspect of the invention. It shall be noted that any embodiment of the first aspect of the invention is applicable to any embodiment of the second aspect of the invention and vice versa. As stated hereinabove, the new bearing design will provide a bearing which is more adapted to accommodate axial loads.

In an embodiment of the present invention, a bearing arrangement for low-speed rotating applications is presented, wherein the bearing arrangement is meant to rotate at a speed of less than 50 routes per minute. In another embodiment, the rotating speed is less than any of 40, 30, 20 or 10 routes per minute. In another embodiment, the rotating speed is such that the rotating speed is lower than the threshold orbital speed at which roller elements are affected by centrifugal forces that exceeds the force of gravity.

According to the third aspect of the invention, a wind turbine bearing arrangement is presented, wherein the wind turbine bearing arrangement comprises a main shaft and at least one bearing for supporting the main shaft, wherein the at least one bearing will accommodate a force in its axial direction, and wherein the bearing is a bearing according to any embodiment of the first aspect of the invention. It shall be noted that any embodiment of the third aspect of the invention is applicable to any embodiment of the first and second aspect of the invention and vice versa. In wind turbine applications, there is often an axial force acting on one of the bearing's in the arrangement. A bearing according to the first aspect of the invention would therefore be advantageously used in this kind of application. In addition, the rotating speed of a wind turbine bearing arrangement is relatively low. In one of the embodiments of the bearing, when there is no spacer ring (such as a guide ring) or mid-flange, would also be another good alternative since the need for a guide ring or mid-flange may not be necessary due to the low rotating speeds.

Other embodiments and modifications to the current embodiments presented herein within the scope of the claims would be apparent to the skilled person. For example, the skilled person will understand and realize that the cage pocket geometry can be designed differently to still achieve the same effect, i.e. that the cage will be essentially in-pitch roller centered.

BRIEF DESCRIPTION OF THE DRAWINGS

Exemplifying embodiments of the present invention will now be described in more detail, with reference to the accompanying drawings, wherein:

FIG. 1 shows a cross sectional view of a bearing according to an embodiment of the present invention.

FIG. 2 shows a side view of an enlarged portion of a cage according to an embodiment of the present invention.

FIG. 3 shows a cross sectional view of an inner ring, cage and roller according to an embodiment of the invention.

FIG. 4 shows a cross sectional view of a bearing arrangement according to the second aspect of the invention.

FIG. 5 shows an embodiment of a wind turbine bearing arrangement according to the third aspect of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION OF THE INVENTION

FIG. 1 shows an embodiment of a spherical roller bearing 1 according to the present invention. The bearing 1 comprises an outer ring 2 presenting at least one inner raceway 21, an inner ring 3 presenting a first and a second outer raceway 31, 32, and a plurality of roller elements 4 arranged in a first and second roller row 41, 42 in-between the at least one inner raceway 21 and the respective first and second outer raceway 31, 32. In addition, the bearing 1 comprises a cage 5 for guiding and/or retaining the roller elements 4 in the first and second roller row 41, 42, and wherein the cage 5 presents a plurality of cage pockets 51, in which each cage pocket 51 one of the roller elements 4 is located. The bearing 1 further presents a specific pitch circle diameter PCD, and the cage 5 is essentially in-pitch roller centered in relation to the pitch circle diameter PCD when there is an axial force acting on the bearing 1. In addition, in this embodiment, there is no guide ring or mid-flange in-between the roller rows 41 and 42.

FIG. 2 shows a more zoomed in view of a cage 5 and roller elements 4 according to an embodiment of the present invention. Here it can be seen that the cage pocket 51 in which one roller element 4 is located presents a specific tangential gap $\Delta_t$ and radial gap $\Delta_r$. The tangential gap $\Delta_t$ is in the tangential direction of the cage and thus also in the rolling patch direction of the roller elements 4. The radial direction $\Delta_r$ is the radial direction of the cage. The tangential gap $\Delta_t$ is set such that there will be a contact between the roller elements 4 and the inner surfaces of the cage pockets 51. The tangential gap $\Delta_t$ may also be varied in the axial direction of the cage 5 and the cage pockets 51, which is not seen in this figure.

FIG. 3 shows a portion of a cross sectional view of a bearing 1 according to an embodiment of the present invention. In this view, a portion of an inner ring 3 can be seen, a cage 5, a roller 4 and a side flange 33 of the inner ring 3. Further, here it can be seen that the cage pocket 51 is outwardly enclosing the roller such that the roller 4 will not be able to move radially outwardly out from the cage pocket 51. This has been done by having a curved profile in the cage pocket 51 such that the roller 4 will eventually contact a contact portion 512 of the cage pocket 51. In addition, the side flange 33 will prevent the roller 4 from axially falling out from the bearing 1. This will lead to that the rollers 4 will be self-contained in the bearing 1. Thus, there is no need for having for example a window-type cage. The rollers 4 will still not be able to fall out from the bearing at any time. This is advantageous, especially for safety reasons.

FIG. 4 shows a cross sectional view of a bearing arrangement 10 according to an embodiment of the second aspect of the present invention. The arrangement 10 comprises a bearing 1 according to the first aspect of the invention and a shaft 6. Further, it can be seen in this example that a force Fa is acting on the bearing 1. The force Fa is acting on in the axial direction of the bearing 1. Thus, the cage will be essentially in-pitch roller centered according to the first aspect of the invention.

FIG. 5 shows a cross sectional view of a wind turbine bearing arrangement 100 according to the third aspect of the present invention. The wind turbine bearing arrangement 100 comprises a bearing 1 according to the first aspect of the invention and a main shaft 6 of the wind turbine. As already stated hereinabove, a wind turbine bearing arrangement will accommodate axial loads.

The invention claimed is:

1. A spherical roller bearing, comprising,
an outer ring including at least one inner raceway,
an inner ring including a first and a second outer raceway,
a plurality of roller elements arranged in a first and second roller row disposed between the at least one inner raceway and the first and second outer raceway, when an axial force is applied to the spherical roller bearing one of the first and second roller rows becomes a loaded row and the other one of the first and second roller rows becomes an unloaded row, the first roller row having a first rotational axis and the second roller row having a second rotational axis wherein the first and second rotational axes of the first and second roller rows, respectively, can vary upon shaft displacement,
a cage for at least one of guiding and retaining the roller elements in the first and second roller row, the cage having a plurality of cage pockets, wherein one the roller elements is positioned in each of the plurality of cage pockets, the cage is not able to prevent the plurality of roller elements from falling out of the cage in an axial direction,
the bearing further presents a specific pitch circle diameter (PCD), and wherein
when the axial force is applied to the spherical roller bearing the cage is configured to center on the loaded row such that upon variation of the first and second rotational axes due to shaft displacement the cage will center on a loaded row rotational axis.

2. The spherical roller bearing according to claim 1, wherein the centering of the cage is arranged such that the loaded row is in contact with the cage.

3. The spherical roller bearing according to claim 1, wherein no spacer ring is disposed axially in-between the first and second roller rows.

4. The spherical roller bearing according to claim 1, wherein at least one of the plurality of cage pockets is radially outwardly enclosing the roller element contained therein such that the roller element will be restricted to move radially outwardly out from the at least one cage pocket.

5. A spherical roller bearing according to claim 1, wherein the inner ring further comprises a first and second axially outer region on opposite axial sides of the spherical roller bearing, and wherein the respective first and second axially outer region provides a first and second respective side flange.

6. The spherical roller bearing according to claim 1, wherein the cage is a comb-shaped cage.

7. The spherical roller bearing according to claim 1, wherein no mid-flange is disposed axially in-between the first and second roller rows.

8. A bearing arrangement providing a bearing, the bearing comprising:
an outer ring including at least one inner raceway,
an inner ring including a first and a second outer raceway,
a plurality of roller elements arranged in a first and second roller row disposed between the at least one inner raceway and the first and second outer raceway, when an axial force is applied to the bearing one of the first and second roller rows becomes a loaded row and the other one of the first and second roller rows becomes an unloaded row, the first roller row having a first rotational axis and the second roller row having a second rotational axis wherein the first and second rotational axes of the first and second roller rows, respectively, can vary upon shaft displacement,
a cage for at least one of guiding and retaining the roller elements in the first and second roller row, the cage having a plurality of cage pockets, wherein one the roller elements is positioned in each of the plurality of cage pockets, the cage is not able to prevent the plurality of roller elements from falling out of the cage in an axial direction,
the bearing further presents a specific pitch circle diameter (PCD), and wherein
when the axial force is applied to the roller bearing the cage is configured to center on the loaded row such that upon variation of the first and second rotational axes due to shaft displacement the cage will center on a loaded row rotational axis.

9. A wind turbine bearing arrangement, the wind turbine bearing arrangement comprising:
a main shaft, and
at least one bearing for supporting the main shaft, wherein the at least one bearing will accommodate a force in its axial direction, and wherein the bearing provides an outer ring including at least one inner raceway,
an inner ring including a first and a second outer raceway,
a plurality of roller elements arranged in a first and second roller row disposed between the at least one inner raceway and the first and second outer raceway, when an axial force is applied to the bearing one of the first and second roller rows becomes a loaded row and the other one of the first and second roller rows becomes an unloaded row, the first roller row having a first rotational axis and the second roller row having a second rotational axis wherein the first and second rotational axes of the first and second roller rows, respectively, can vary upon shaft displacement,
a cage for at least one of guiding and retaining the roller elements in the first and second roller row, the cage having a plurality of cage pockets, wherein one the roller elements is positioned in each of the plurality of cage pockets, the cage is not able to prevent the plurality of roller elements from falling out of the cage in an axial direction,
the bearing further presents a specific pitch circle diameter (PCD), and wherein
when the axial force is applied to the roller bearing the cage is configured to center on the loaded row such that upon variation of the first and second rotational axes due to shaft displacement the cage will center on a loaded row rotational axis.

* * * * *